Patented Oct. 9, 1923.

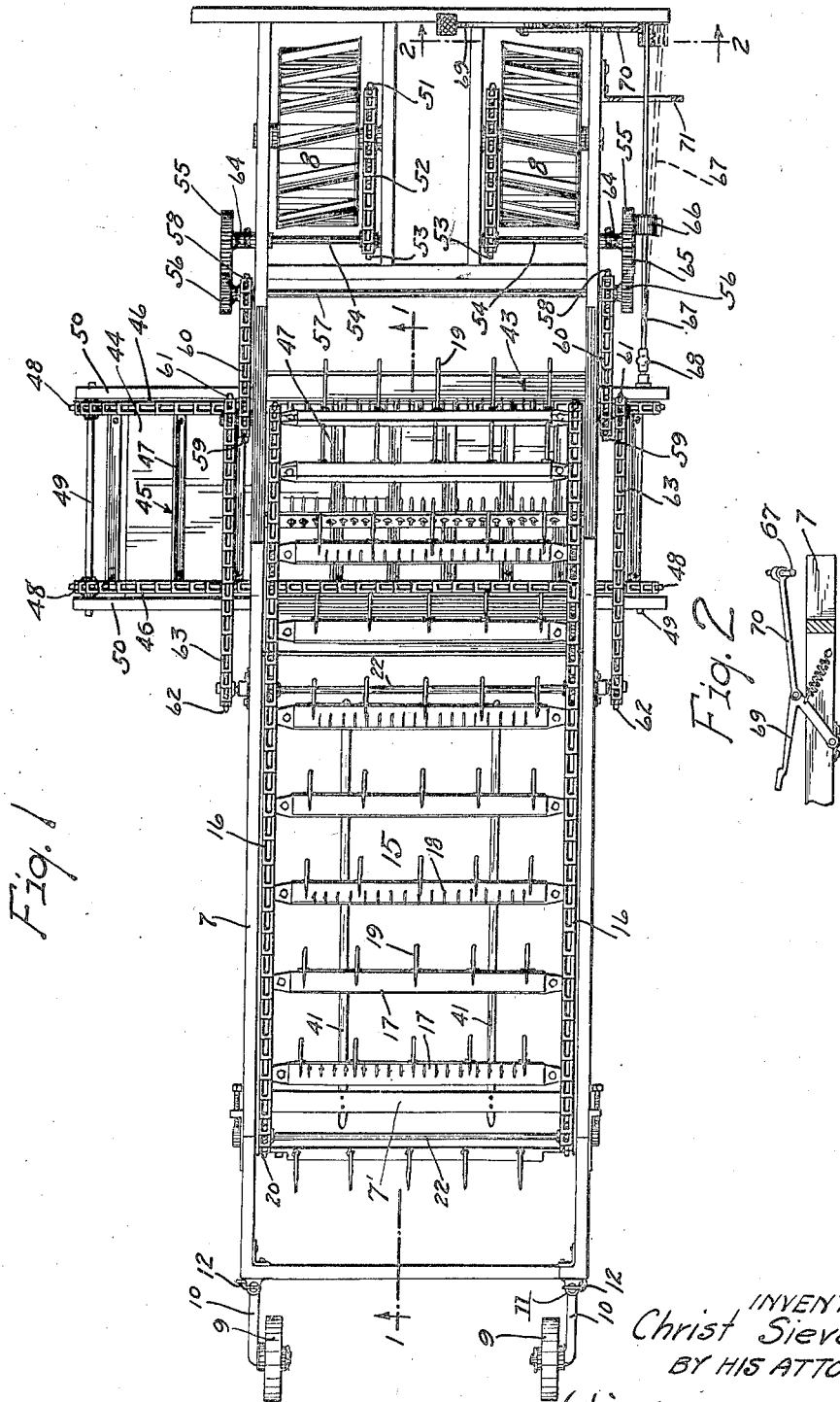

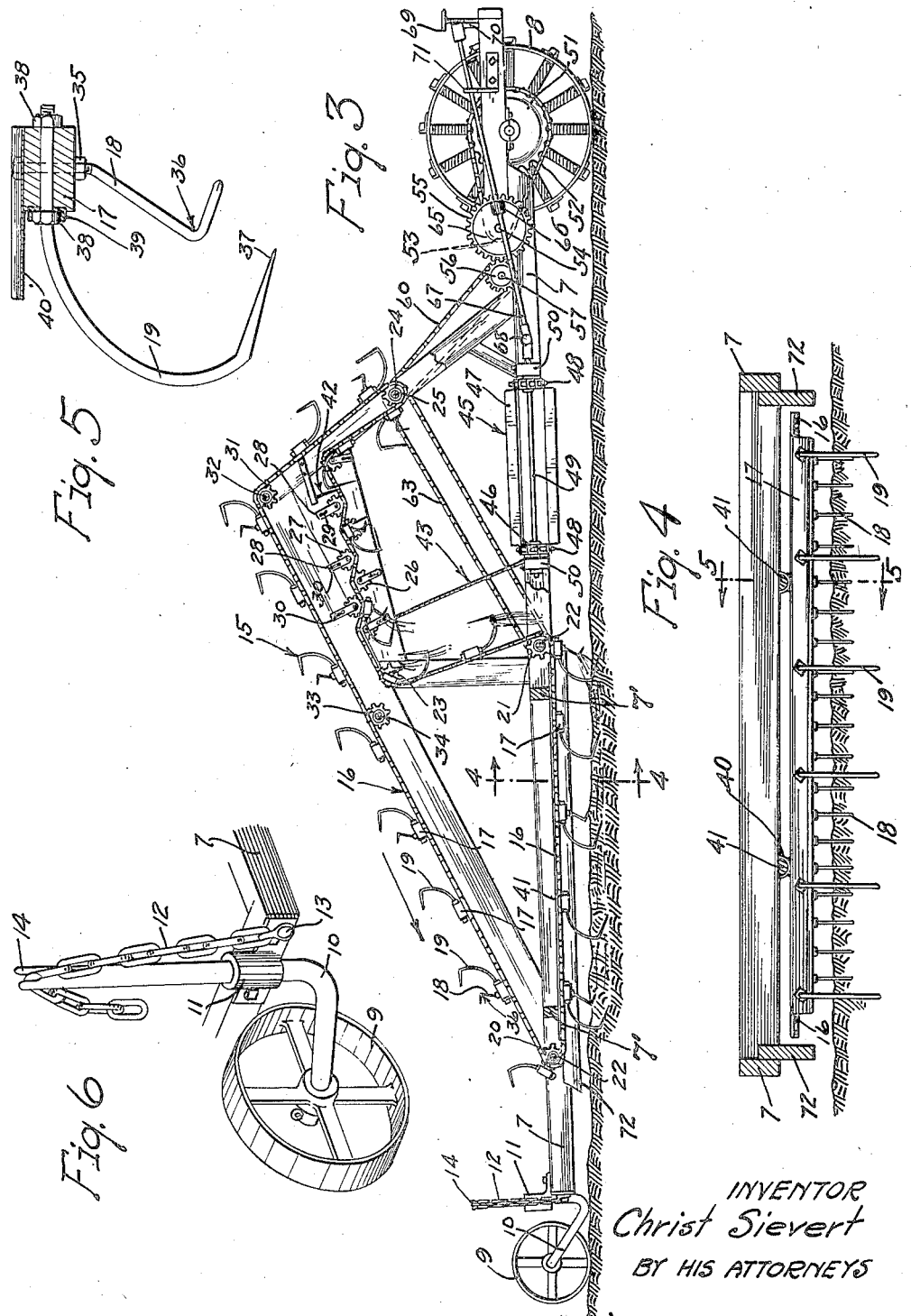

1,470,393

UNITED STATES PATENT OFFICE.

CHRIST SIEVERT, OF CALIO, NORTH DAKOTA.

QUACK-GRASS DIGGER.

Application filed March 1, 1920. Serial No. 362,260.

*To all whom it may concern:*

Be it known that I, CHRIST SIEVERT, a citizen of the United States, residing at Calio, in the county of Cavalier and State of North Dakota, have invented certain new and useful Improvements in Quack-Grass Diggers; and I do hereby declare the following to be a full, clear, and exact description of the invention, such as will enable others skilled in the art to which it appertains to make and use the same.

My invention has for its object to provide a highly efficient quack grass digger, and to this end, it consists of the novel devices and combinations of devices hereinafter described and defined in the claims.

In the accompanying drawings, which illustrate the invention, like characters indicate like parts throughout the several views.

Referring to the drawings:—

Fig. 1 is a plan view of the quack grass digger;

Fig. 2 is a detail view partly in elevation and partly in section taken on the line 2—2 of Fig. 1;

Fig. 3 is a view partly in side elevation and partly in longitudinal central section taken on the line 1—1 of Fig. 1;

Fig. 4 is a transverse section taken on the line 4—4 of Fig. 3, on an enlarged scale;

Fig. 5 is a detail view partly in side elevation and partly in section taken on the line 5—5 of Fig. 4; and Fig. 6 is an enlarged perspective view of one of the caster wheels.

The improved quack grass digger may be drawn by draft means or a tractor, and includes a frame 7, the front end of which is supported on a pair of independently mounted traction wheels 8, and the rear end of which is supported on a pair of caster wheels 9 for raising or lowering movement. The caster wheel brackets 10 have arms that are mounted in bearings 11 on the frame 7 for turning and endwise sliding movements. The rear end of the frame 7 is adjustably supported from the caster wheel brackets 10 by means of chains 12 having one of their ends anchored at 13 to the bearings 11 and the links of which are adapted to interlock with notches 14, as shown in Fig. 6.

An endless travelling rake 15 is mounted on the frame 7 and is made up of a pair of laterally spaced endless chains 16, a multiplicity of transverse bars 17, the ends of which are secured to certain of the links in said chains, at predetermined longitudinally spaced points, a transverse row of top surface teeth 18 secured to each bar 17 and a transverse row of sub-surface teeth 19 also secured to each bar 17 back of the top surface teeth 18. During one complete cycle of the endless travelling rake, the same passes through a working zone, an elevating zone, a discharge zone and a return zone. The rake, while passing through the working zone, moves forward from a rear pair of sprocket wheels 20 to a front pair of sprocket wheels 21, over which the chains 16 travel. These sprocket wheels 20 and 21 are secured to transverse shafts 22, journaled on the frame 7. From the sprocket wheels 21, the rake passes through its elevating zone, in which it is slightly rearwardly inclined, and its chains 16 pass over a pair of sprocket wheels 23 journaled on the frame 7. During the travel of the rake through its discharge zone, the chains 16 thereof pass alternately over sprocket wheels 26 and under sprocket wheels 27 journaled on brackets 28 having vertically disposed slots 29, through which extend clamping bolts 30 anchored to the frame 7 and provided to adjustably secure said brackets thereto. The sprocket chains 16, as the rake passes from its discharge zone, run under sprocket wheels 24 on a transverse shaft 25 journaled in the frame 7.

By reference to Fig. 3, it will be noted that the sprocket wheels 26 are horizontally spaced and that the sprocket wheels 27 extend therebetween so that as the chains 16 pass over the sprocket wheels 26 and under the sprocket wheels 27, they are alternately given a downward dip and then an upward movement. This action is repeated several times while the rake is passing through its discharge zone, for a purpose that will presently appear.

From the sprocket wheels 24, the rake begins its return movement and first travels upwardly and rearwardly over sprocket wheels 31 on a shaft 32 journaled in the frame 7, and then it travels downwardly and rearwardly to the sprocket wheels 20. During the movement of the rake between the sprocket wheels 31 and 20, the chains 16 pass over and are supported on sprocket wheels 33 secured to a shaft 34 journaled in the frame 7.

The frame 7, at its rear end, is adjustably suported from the caster wheels 9 in a manner to lower said rear end and thereby cause the teeth 19 to first enter the ground at the greatest depth at which the soil is worked, and then gradually pass out of the ground as the sprocket chains 16 pass over the sprocket wheels 21. The movement of the upper surface teeth through the ground is substantially parallel to the movement of the teeth 19 therethrough. As best shown in Fig. 5, the top surface teeth 18 are provided with shanks which extend upward through bores in the bars 17 from the bottoms thereof and are rigidly secured to said bars by opposing nuts 35. The bodies of the teeth 18 are rearwardly and downwardly inclined and their lower free ends extend abruptly forward and downward to afford V-shaped gathering crotches 36.

The shanks of the sub-surface teeth 19 extend forward from the backs of the bars 17 through bores formed therein and their bodies are curved rearwardly, downwardly and then forwardly and terminate in relatively long sharp points 37, which are forwardly and downwardly inclined and located rearward of and below the lower ends of the top surface teeth 18. The teeth 19 are secured in the bars 17 by pairs of opposing nuts 38, the rearmost of which are preferably welded to the shanks of the teeth 19 to afford stop shoulders, and the forward of said nuts having screw-threaded engagement with said shanks. To hold the teeth 19 against turning movement in the bars 17, there is secured to the rear face of each of said bars a channel member 39, into which the rear fixed nuts 38 extend and are held against turning movement by the flanges on said channel members.

To hold the bars 17 against transverse rocking movement while the rake 15 is passing through its working zone and the teeth 18 and 19 are in the ground, there is secured to the upper face of each bar 17 a pair of forwardly and rearwardly extended channel members 40, which ride on the under faces of guide bars 41 secured to the transverse members 7' of the frame 7. These fixed guide bars 41 also hold the rake 15 for straight-line travelling movement and against raising and lowering movements.

By reference to Fig. 4, it will be noted that the top surface teeth 18, on each bar 17, are set relatively close together, while the sub-surface teeth 19 are set considerably farther apart. To assist in removing the quack grass from the teeth 18 and 19, there is provided a fixed comb 42 secured to the frame 7 with its teeth inclined slightly forward and downward, and through which the teeth 18 and 19 pass during the travel of the rake through its discharge zone.

Underlying the discharge zone, through which the rake passes, is a transversely extended hopper 43 having in its bottom a deck 44, which extends considerably outward of the frame 7 at the left side thereof. Mounted to travel over the deck 44 is an endless carrier 45 comprising a pair of sprocket chains 46 and a multiplicity of transverse slats 47, as shown in the form of angle bars, secured at their ends to certain of the links of the chains 46. Said chains 46 are arranged to run over front and rear pairs of sprocket wheels 48 secured to shafts 49 journaled in the ends of a pair of transverse bars 50 secured to the frame 7.

The endless travelling rake is continuously driven, while the quack grass digger is moving, by the following connections, towit:—Secured to the inner end of the hub of each traction wheel 8 is a sprocket wheel 51. The sprocket chains 52 run over the sprocket wheels 51 and relatively small sprocket wheels 53 on the inner ends of a pair of axially aligned countershafts 54 journaled in the frame 7. On the outer ends of the countershafts 54 are spur gears 55 which mesh with spur pinions 56 secured to a long countershaft 57 journaled in the frame 7 and extending completely therethrough. Secured to the countershaft 57, between the frame 7 and spur pinions 56, is a pair of relatively small sprocket wheels 58, over which and relatively large idle sprocket wheels 59, journaled on the frame 7, run sprocket chains 60. Secured to the sprocket wheels 59, for rotation therewith, are sprocket wheels 61 aligned with sprocket wheels 62 on the outer projecting ends of the forward shaft 22, and over which aligned sprocket wheels 61 and 62 run sprocket chains 63, which complete the driving connections from the traction wheels 8 to the shaft 22 of the rake 15.

To permit the traction wheels 8 to slip, the one in respect to the other, the spur gears 55 are connected to their respective shafts 54 by one-way clutches 64, of any suitable construction, but preferably provided with shipper levers, not shown. The endless carrier 45 is intermittently driven from the driving connections for the rake by a clutch, which, as shown, is in the form of a friction face 65 on the right-hand supporting gear 55, and a friction pinion 66 on a shaft 67, one end of which is attached by a universal joint 68 to the right-hand shaft 49 of the carrier 45. The other end of the shaft 67 is connected by a link 70 to a spring-held foot lever 69. The spring-held foot lever 69 normally holds the shaft 67 through the link 70 in a position with the friction pinion 66 out of contact with the friction face 65, so that the carrier remains idle. A bracket 71, on the frame 7, is provided for supporting the end of the shaft 67, to which is attached the link 70. On the sides of the frame 7 are runners 72 provided to engage rough or uneven surfaces and thereby cause the frame to ride thereover and support said frame in a position with the bars 17 as they are passing through the working zone out of contact with the ground.

Operation.

The operation of the improved quack grass digger may be briefly described as follows:—

As previously stated, the machine may be either drawn by draft animals or a tractor. In starting to work, the clutches 64 are set to complete the travelling conections from the traction wheels 8 to the shaft 22 and thereby drive the rake 15 in the direction of the arrow marked thereon in Fig. 3. These connections are such as to drive the rake 15 at a speed considerably faster than the speed at which the machine is travelling.

The teeth 18 and 19, owing to the speed at which they travel in respect to the movement of the machine, will thoroughly break up and pulverize the soil. By causing the teeth 18 and 19 to first enter the soil at their greatest depth and gradually pass out of the soil, there is produced a lifting action, which pulls the quack grass and brings the same to the surface. The closely positioned top surface teeth 18 will thoroughly rake the top of the soil and gather in their crotches 36 the greater part of the quack grass. The balance thereof will be gathered by the subsurface teeth 19.

The backward inclination of the rake, while passing through its elevating zone, will hold the quack grass on the teeth 18 and 19. While the rake is passing through its discharge zone, the quack grass is removed from the teeth principally by the intermittent backward and upward movement given to the teeth under the action of the rake by the passing of its chains over the sprocket wheels 26 and under the sprocket wheels 27. Part of the quack grass will be removed from the teeth by causing said teeth to travel through the comb 42. During the final travelling movement of the rake through the discharge zone, the same is caused to travel in a direction that throws its teeth upwardly and backwardly, so that in case any of the quack grass is still clinging thereto, the same will be free to drop therefrom.

The quack grass removed from the rake, while passing through its discharge zone, is precipitated into the hopper 43, onto the endless carrier 45 and deck 44. When the hopper is full of quack grass, the operator may step on the foot lever 69 and thereby cause the friction pinion 66 to engage the friction face 65 on the right-hand moving gear 55 and thereby cause the driving connections for the carrier 45 to impart a very rapid travelling movement to said carrier to discharge the quack grass from the hopper into a single pile on the ground at one side of the machine where the same may be either carted away or burned. As previously stated, the elevation of the rear end of the frame 7 may be varied, at will, by the adjustable connections between said frame and caster wheel brackets, to vary the depth at which the teeth 18 and 19 enter the ground.

The above described quack grass digger has, in actual usage, proven highly efficient for the purpose had in view, and it not only rids the soil from the quack grass but leaves the same in a fine pulverized condition for a seed bed.

It is, of course, understood that in place of driving the rake and carrier from the traction wheels of the machine, an independent engine may be mounted on the frame and said parts driven therefrom.

What I claim is:

1. In a quack grass digger, the combination with a wheel-supported frame and means for propelling the same, of an endless travelling rake having a working zone mounted on the frame, means for driving the rake, and means for guiding the rake through the ground in its working zone in a plane, sloping upwardly in the direction of its movement.

2. In a quack grass digger, the combination with a wheel-supported frame and means for propelling the same, of an endless travelling rake having a working zone mounted on the frame, means for driving the rake, means for guiding the rake through the ground in its working zone in a forwardly and upwardly inclined plane, and means for changing the inclination of the rake while passing through its working zone.

3. In a quack grass digger, the combination with a wheel-supported frame and means for propelling the same, of an endless travelling rake having a working zone mounted on the frame, means for driving the rake, said rake comprising a pair of endless chains, and a plurality of tooth-equipped bars carried by the chains the teeth of which are adapted to move through the ground, guide rails on the frame, and guide members on said transverse bars engageable with the guide rails during the travel of the rake through the ground in its working zone for guiding the rake upwardly during its travel through the working zone.

4. In a quack grass digger, the combination with a wheel-supported frame and means for propelling the same, of an endless travelling rake mounted on the frame, means for driving the rake, said rake comprising a pair of endless chains and a plurality of tooth-equipped bars carried by the chains, said rake arranged to travel through a working zone, an elevating zone and a discharge zone, and means operative on the rake, while passing through its discharge zone, to intermittently impart to its transverse bars a movement that will throw the teeth upward and backward.

5. In a quack grass digger, the combination with a wheel-supported frame and means for propelling the same, of an endless travelling rake mounted on the frame, means for driving the rake, said rake comprising a pair of endless chains, a plurality of transverse bars carried by the chains, and sub-surface teeth and top surface teeth carried by the bars.

6. In a quack grass digger, the combination with a wheel-supported frame and means for propelling the same, of an endless travelling rake mounted on the frame, means for driving the rake, said rake comprising a pair of endless chains, a plurality of transverse bars carried by the chains, and sub-surface teeth and top surface teeth carried by the bars, said top surface teeth being provided with gathering crotches.

7. In a quack grass digger, the combination with a wheel-supported frame and means for propelling the same, of an endless travelling rake mounted on the frame, means for driving the rake, said rake comprising a pair of endless chains, a plurality of transverse bars carried by the chains, and sub-surface teeth and top surface teeth carried by the bars, said top surface teeth being provided with gathering crotches and said sub-surface teeth having sharp downwardly and forwardly inclined points.

8. A quack grass digger having in combination a wheel supported frame and means for propelling the same, an endless traveling rake having teeth carried thereby, and means for moving said rake through the ground with the teeth depending therefrom and traveling through the ground in the direction of movement of the wheel supported frame and at a different speed therefrom.

In testimony whereof I affix my signature in presence of two witnesses.

CHRIST SIEVERT.

Witnesses:
  A. O. RYE,
  CARL WILBORN.